UNITED STATES PATENT OFFICE.

CHARLES E. COLLINS, OF NEW YORK, N. Y.

GEARING.

1,044,991.    Specification of Letters Patent.    Patented Nov. 19, 1912.

Application filed February 29, 1912. Serial No. 680,705.

*To all whom it may concern:*

Be it known that I, CHARLES E. COLLINS, a citizen of the United States, and a resident of the city of New York, borough of Manhattan, in the county and State of New York, have invented a new and Improved Gearing, of which the following is a full, clear, and exact description.

This invention relates especially to gear casings adapted especially for automobile practice, and my object is to provide a casing of this character primarily for the purpose of securing greater facility in inspecting and making repairs in that type of automobile transmission mechanism in which are used both the slidable gear speed changing devices and the worm driven mechanism than has heretofore been possible.

A further object of the invention is to provide a gear casing which will suitably house all of the foregoing transmission devices in a neat, compact and symmetrical unitary structure.

The foregoing and other objects of the invention are attained by the mechanism hereinafter fully described and claimed and illustrated in the accompanying drawings in which—

Figure 1:
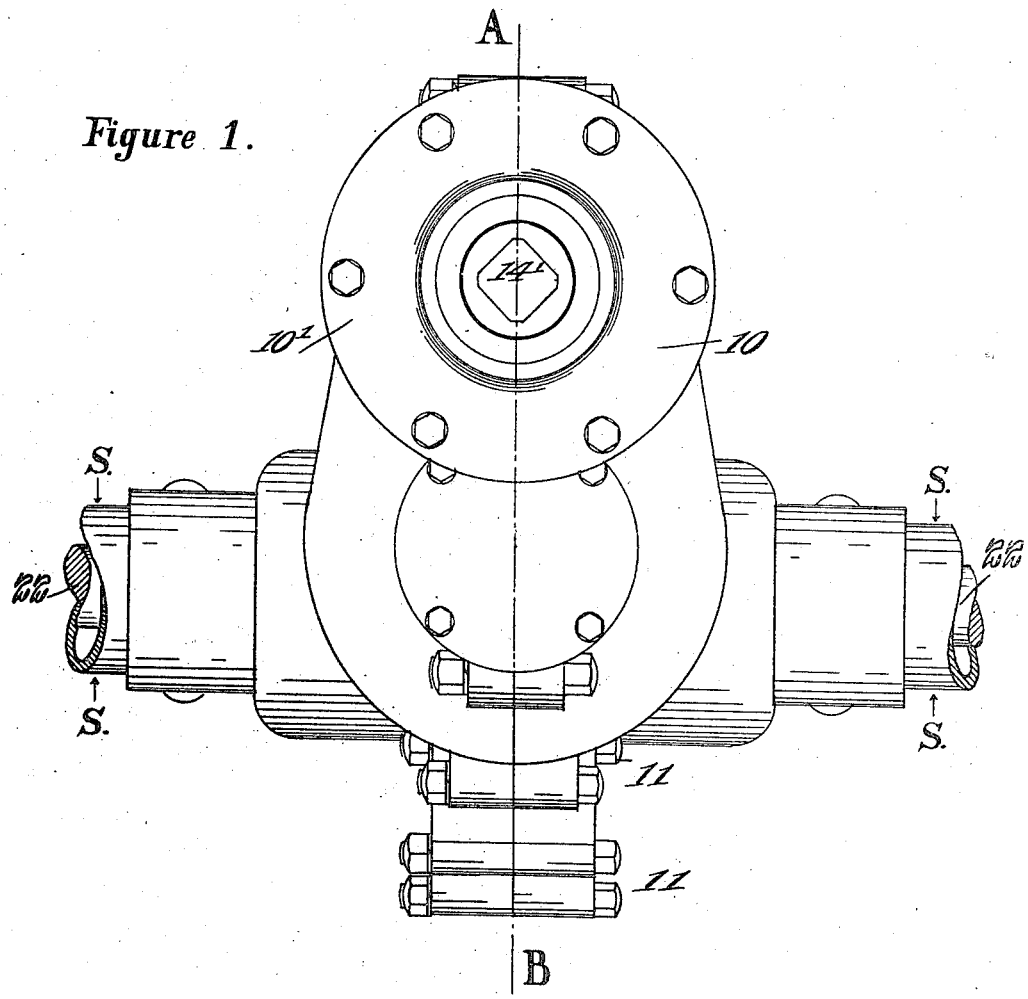
Figure 2:
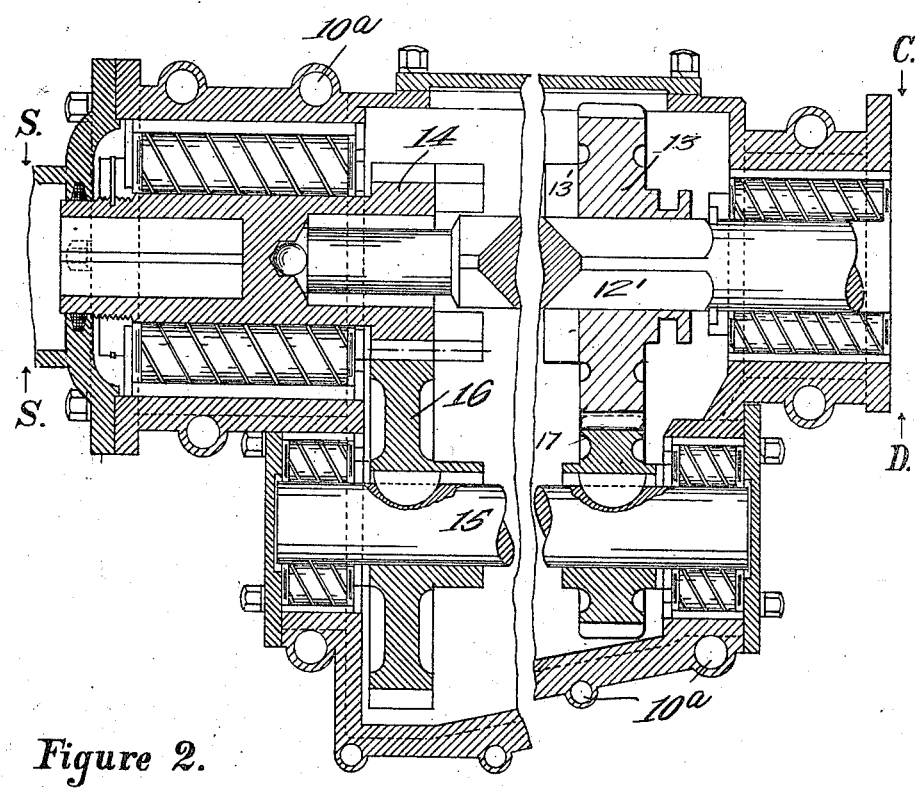
Figure 3:
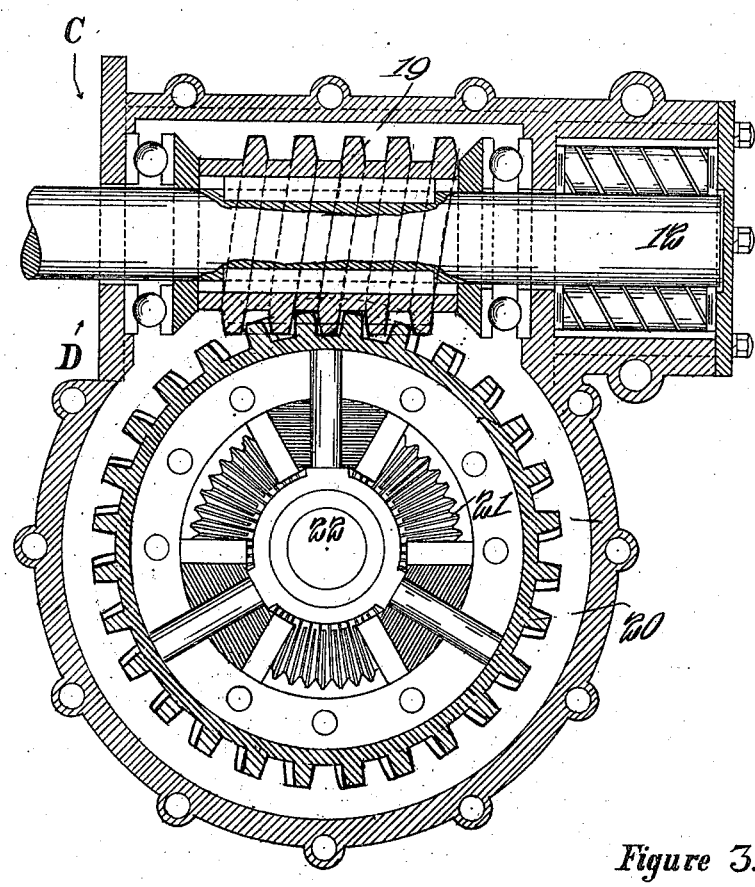

Figure 1 is a front elevation of the mechanism looking toward the right in Fig. 2; Fig. 2 is a vertical longitudinal section of the casing and inclosed parts; and Fig. 3 is a similar view of the gearing, this figure to be understood as being a continuation of Fig. 2, but made as a separate figure for convenience of illustration only.

Referring particularly to the drawings I have shown at 10 and 10' the portions of a casing adapted to be connected in a central vertical longitudinal plane through the axis of the motor shaft (not shown). Said casing sections are adapted to be detachably yet rigidly connected by means of any suitable number of bolts 11 passing through lugs 10$^a$ of said casing sections. While I have indicated the slidable gear transmission portion of the device as being separable on the line C—D from the worm driving mechanism portion, I wish to be understood that the sections 10 and 10' may extend so as to include both portions of the driving mechanism so as to construct the casing of a unitary nature.

Within the casing above described is shown a main gear shaft 12 having a polygonal portion 12' on which is slidably mounted a gear 13 having a clutch member 13' adapted to engage directly with the corresponding clutch of a gear 14 into whose hub the shaft 12 extends at one end and said gear hub being adapted to receive the power shaft at its other end in a polygonal socket 14', whereby the gear 14 will be continuously operated from the motor.

At 15 is shown a countershaft parallel to the main shaft 12 and journaled in the casing in suitable bearings. Said countershaft is driven from the gear 14 through a gear 16 and also connected with the countershaft is a low speed pinion 17 and also a reversing set 18. On another portion of the shaft 12 within the casing is a worm 19 having direct driving connection with the inclosed worm wheel 20 carrying the differential mechanism 21 connected to the driven shaft or axle 22. It will appear, therefore, that my construction provides a substantially two-part casing longitudinally and centrally divided, each part of the casing inclosing a portion of each of the related sets of gearing or transmitting devices, namely, the change speed mechanism and the worm driven differential mechanism. The shaft 12 is therefore common to both sets of gear mechanism, and being a rigid member, the stability and rigidity of the casing structure are thereby greatly augmented. I am aware, in my extensive automobile experience, of the importance of this compact and easily accessible construction in this type of transmission mechanism, and while I am further aware that gear casings of other types have been constructed divided either longitudinally or transversely, I believe I am the first to construct a casing of this character embodying the features of advantage herein set forth.

Having thus described my invention, what I claim as new and desire to secure by Letters Patent is:

In combination, the herein described gearing comprising a pair of symmetrical casing sections detachably connected together in a longitudinal central vertical plane, said sections comprising in a single symmetrical compact unitary construction associated portions, a change speed mechanism in one of said portions, and an associated worm driving differential mechanism in the other casing portion, said change speed mechanism and differential mechanism including a single rigid main shaft common to both of them, substantially as set forth.

Dated, New York, February 28, 1912.

CHARLES E. COLLINS.

Witnesses:
EUGENE V. DALY,
FREDK. A. ROSS.

Copies of this patent may be obtained for five cents each, by addressing the "Commissioner of Patents, Washington, D. C."